(12) United States Patent
Koga

(10) Patent No.: US 10,641,865 B2
(45) Date of Patent: May 5, 2020

(54) COMPUTER-READABLE RECORDING MEDIUM, DISPLAY CONTROL METHOD AND DISPLAY CONTROL DEVICE

(71) Applicant: FUJITSU LIMITED, Kawasaki-shi, Kanagawa (JP)

(72) Inventor: Susumu Koga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 282 days.

(21) Appl. No.: 15/787,825

(22) Filed: Oct. 19, 2017

(65) Prior Publication Data

US 2018/0164404 A1 Jun. 14, 2018

(30) Foreign Application Priority Data

Dec. 14, 2016 (JP) .................. 2016-242587

(51) Int. Cl.
*G01S 7/24* (2006.01)
*G02B 27/01* (2006.01)
(Continued)

(52) U.S. Cl.
CPC ................ *G01S 7/24* (2013.01); *G01S 7/064* (2013.01); *G01S 7/10* (2013.01); *G01S 19/42* (2013.01);
(Continued)

(58) Field of Classification Search
CPC ......... H04M 2250/52; H04M 2250/10; H04M 1/72572; H04M 1/72522; H04M 2250/16; H04L 67/18; H04W 4/029; H04W 64/00; H04W 4/025; H04W 4/02; H04W 4/027; G06T 19/006; G06T 11/60; G06T 11/00; G06T 2200/24; G06T 2215/16; G06K 9/00671; G06K 9/00604; G06K 9/3233; G06K 9/00087; G06K 9/00208; G06K 9/22; G06K 9/6215; G06F 3/011; G06F 3/0346; G06F 3/147; G06F 3/017; G06F 3/04815; G06F 3/14; G06F 1/3287; G06F 1/1694;
(Continued)

(56) References Cited

U.S. PATENT DOCUMENTS 10,026,226 B1 * 7/2018 Lotto ..................... G06T 19/006
10,222,876 B2 * 3/2019 Koga .................... G06F 3/0346
(Continued)

FOREIGN PATENT DOCUMENTS

JP 2006-017498 A 1/2006
JP 2012-021850 A 2/2012

*Primary Examiner* — Olumide Ajibade Akonai
(74) *Attorney, Agent, or Firm* — Westerman, Hattori, Daniels & Adrian, LLP

(57) ABSTRACT

A non-transitory computer readable recording medium stores therein a program that causes a computer to execute a process including: executing a process of acquiring a position of a terminal; determining whether there is object data registered in a position in an area corresponding to the acquired position by referring to a storage that stores positions in which multiple sets of object data are registered in association with the sets of object data, respectively; and displaying object data on a display when there is the object data registered in a position in the area, and curbing any one of frequency of executing the process of acquiring the position of the terminal and accuracy of the acquiring when there is no object data registered in a position in the area.

19 Claims, 10 Drawing Sheets

(51) Int. Cl.
- *G01S 19/42* (2010.01)
- *G06F 3/01* (2006.01)
- *G01S 7/06* (2006.01)
- *G06F 3/14* (2006.01)
- *G01S 7/10* (2006.01)
- *G06F 3/0481* (2013.01)
- *G01S 7/12* (2006.01)
- *G01S 7/22* (2006.01)

(52) U.S. Cl.
CPC ......... *G02B 27/01* (2013.01); *G02B 27/0172* (2013.01); *G06F 3/011* (2013.01); *G06F 3/04815* (2013.01); *G06F 3/14* (2013.01); *G01S 7/12* (2013.01); *G01S 7/22* (2013.01); *G02B 27/017* (2013.01); *G02B 2027/014* (2013.01); *G09G 2330/021* (2013.01)

(58) Field of Classification Search
CPC ........ G06F 1/325; G06F 1/3231; G06F 1/163; G02B 27/017; G02B 2027/0138; G02B 2027/014; G02B 27/01; G02B 27/0172; G02B 27/014; G01S 7/24; G01S 7/064; G01S 7/10; G01S 19/42; G01S 7/12; G01S 7/22; G09G 2330/021

See application file for complete search history.

(56) References Cited

U.S. PATENT DOCUMENTS

| | | | |
|---|---|---|---|
| 2009/0088184 A1* | 4/2009 | Yasuhara | G01C 21/20 455/456.6 |
| 2010/0130251 A1* | 5/2010 | Chu | H04M 1/72544 455/556.1 |
| 2012/0101722 A1* | 4/2012 | Inami | G01C 21/3688 701/428 |
| 2012/0148106 A1* | 6/2012 | Sung | G06T 19/006 382/106 |
| 2013/0286048 A1* | 10/2013 | Sternitzke | G06Q 10/06 345/633 |
| 2014/0125699 A1* | 5/2014 | Lotto | G06T 19/006 345/633 |
| 2014/0168056 A1* | 6/2014 | Swaminathan | G06K 9/00604 345/156 |
| 2014/0240552 A1* | 8/2014 | Kasahara | H04N 5/2256 348/239 |
| 2014/0285521 A1* | 9/2014 | Kimura | G06F 3/011 345/633 |
| 2014/0342750 A1* | 11/2014 | Kwak | H04W 64/003 455/456.1 |
| 2017/0262074 A1* | 9/2017 | Koga | G06F 3/0346 |

* cited by examiner

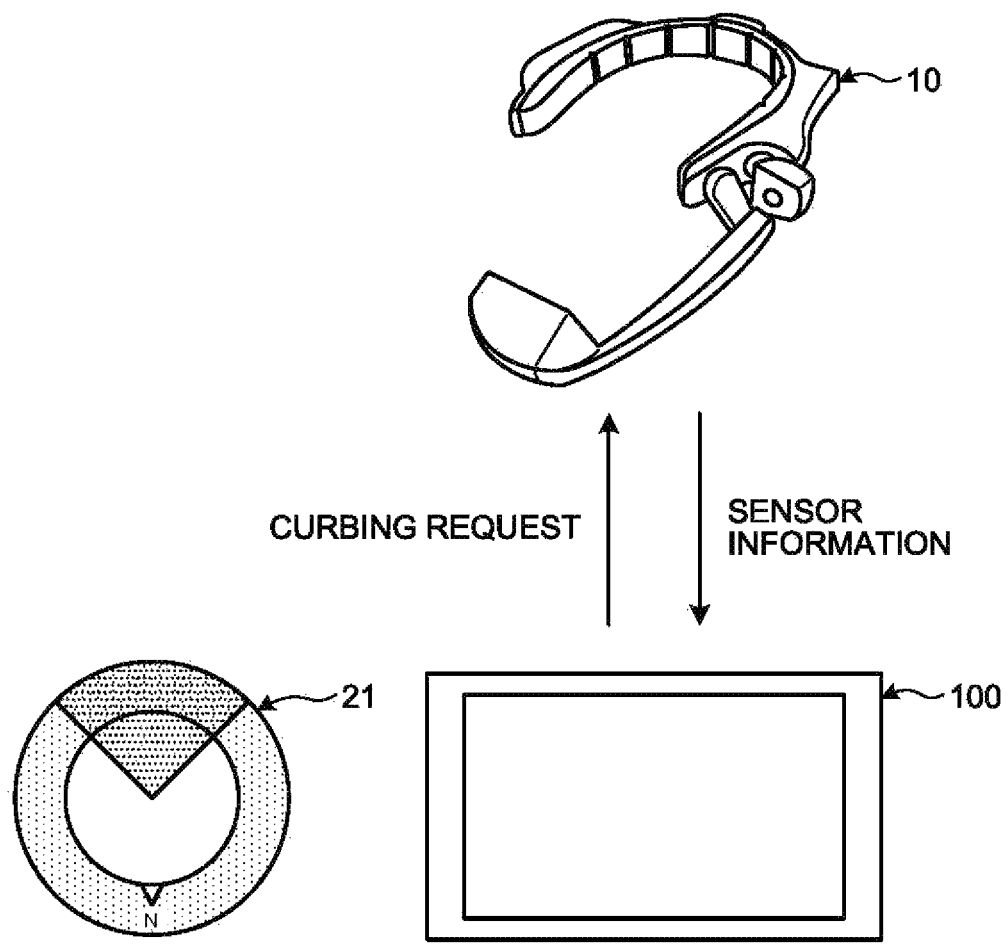

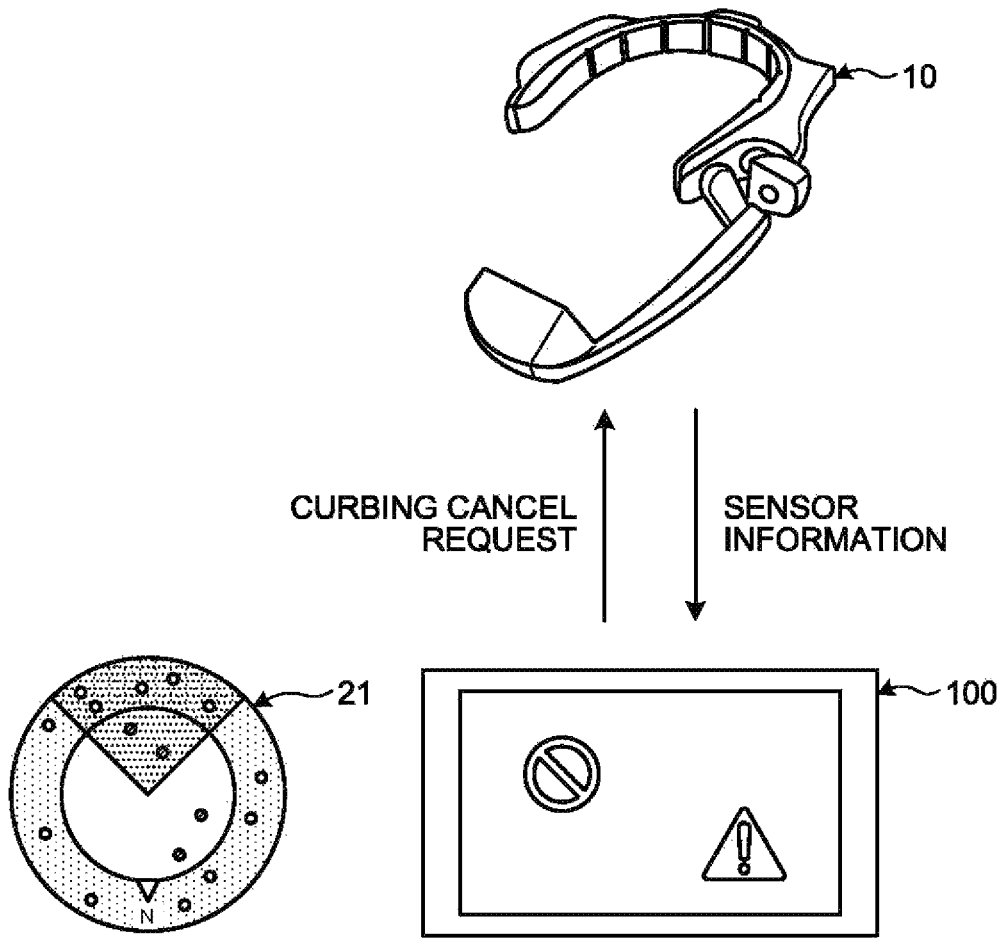

COMPUTER-READABLE RECORDING MEDIUM, DISPLAY CONTROL METHOD AND DISPLAY CONTROL DEVICE

CROSS-REFERENCE TO RELATED APPLICATION

This application is based upon and claims the benefit of priority of the prior Japanese Patent Application No. 2016-242587, filed on Dec. 14, 2016, the entire contents of which are incorporated herein by reference.

FIELD

The embodiment discussed herein is related to a computer-readable recording medium, a display control method, and a display control device.

BACKGROUND

Recently, augmented reality (AR) technologies in which an object is displayed on a captured image in a superimposed manner with a display device, such as a head mounted display, have been proposed. To display an object in a superimposed manner by AR, the position and orientation of the head mounted display are detected and the object is changed according to the detected position and direction. Accordingly, the object according to the position of a user and direction in which the user faces is displayed on a captured image in a superimposed manner on the head mounted display. For power saving, it is proposed that an area in which a terminal shifts from a sleep mode to an active mode on the basis of global positioning system (GPS) signals is set and, when the terminal enters the area, which is set, the terminal sifts from the sleep mode to the active mode. It is also proposed that GPS satellites are captured on the basis of auxiliary information indicating the orientations of the GPS satellites, positioning is performed, positioning accuracy is determined on the basis of the intensities of signals received from the captured GPS satellites and the orientations of the GPS satellites, and frequency of executing a positioning process is executed is set.

Patent Document 1: Japanese Laid-open Patent Publication No. 2006-17498

Patent Document 2: Japanese Laid-open Patent Publication No. 2012-21850

SUMMARY

According to an aspect of an embodiment, a non-transitory computer readable recording medium stores therein a program that causes a computer to execute a process including: executing a process of acquiring a position of a terminal; determining whether there is object data registered in a position in an area corresponding to the acquired position by referring to a storage that stores positions in which multiple sets of object data are registered in association with the sets of object data, respectively; and displaying object data on a display when there is the object data registered in a position in the area, and curbing any one of frequency of executing the process of acquiring the position of the terminal and accuracy of the acquiring when there is no object data registered in a position in the area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating exemplary operations relating to acquisition of a position in the case where there is no object data in the display area;

FIG. 8 is a diagram illustrating exemplary operations relating to acquisition of a position in the case where there is no object data in the display area;

FIG. 9 is a diagram illustrating an exemplary object data storage unit;

DESCRIPTION OF EMBODIMENT

While an AR application is being used, however, keeping receiving GPS signals is needed in order to detect the position of the user even when no object is set around the user. This increases the power consumption of the head mounted display that receives GPS signals and the terminal.

Preferred embodiments of the present invention will be explained with reference to accompanying drawings. The embodiments do not limit the disclosed technology. The following embodiments may be combined as appropriate as long as no inconsistency is caused.

Figure 1:
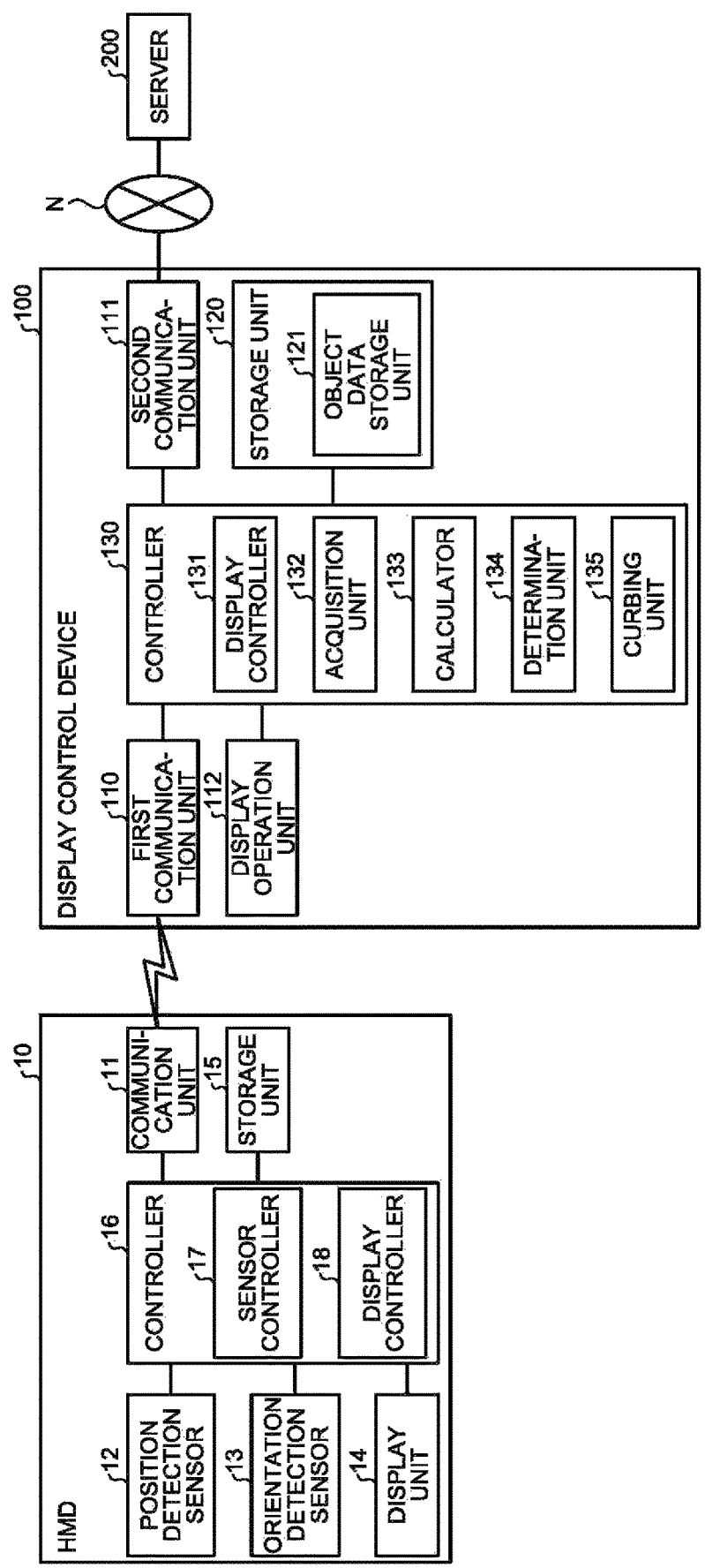
FIG. 1 is a block diagram illustrating an exemplary configuration of a display control system according to an embodiment.

FIG. 1 is a block diagram illustrating an exemplary configuration of a display control system according to an embodiment. A display control system 1 illustrated in FIG. 1 includes a head mounted display (HMD) 10, a display control device 100, and a server 200. The HMD 10 and the display control device 100 are connected one-on-one by wired or wireless connection. In other words, the HMD 10 functions as an exemplary display unit of the display control device 100. The HMD 10 and the display control device 100 are not limited to one-on-one connection. One-to-multiple connection or multiple-to-multiple connection may be used. FIG. 1 exemplifies one set of the HMD 10 and the display control device 100; however, there is no limitation on the number of sets of the HMD 10 and the display control device 100. The display control system 1 may include any number of sets of the HMD 10 and the display control device 100.

The HMD 10 and the display control device 100 are connected by, for example, a wireless local area network (LAN) according to, for example, Wi-Fi Direct (trademark) such that the HMD 10 and the display control device 100 are able to communicate with each other. The display control device 100 and the server 200 are connected via a network N such that display control device 100 and the server 200 are able to communicate with each other. For the network N, any type of communication network, such as the Internet, a LAN or a virtual private network (VPN), may be used regardless whether the network is wired or wireless.

The user wears the HMD 10 and the display control device 100 and the HMD 10 displays a display screen that is transmitted from the display control device 100. For the HMD 10, for example, it is possible to use a monocular see-though HMD. For the HMD 10, for example, various types of HMD, such as a binocular HDM or immersive HMD may be used. The HMD 10 includes a position detection sensor and an orientation detection sensor in order to detect the position of the user and the orientation of the face.

The display control device 100 is an information processing device that is worn and operated by the user. For the display control device 100, for example, a mobile communication terminal, such as a tablet or a smartphone, may be used. The display control device 100, for example, receives information about the position and orientation that are detected by the position detection sensor and the orientation detection sensor of the HMD 10 from the HMD 10. On the basis of the received information about the position and orientation, the display control device 100 executes a process of acquiring the position of the HMD 10, i.e., the terminal. The display control device 100 includes a storage unit that stores positions in which multiple sets of object data are registered, respectively, in association with the respective sets of object data. The display control device 100 refers to the storage unit and determines whether there is object data registered in a position in an area corresponding to the acquired position. When there is object data registered in the position in the area, the display control device 100 displays the object data on the display unit. When there is no object data registered in the position in the area, the display control device 100 curbs frequency of executing a process of acquiring the position of the terminal or accuracy of acquisition. In other words, the display control device 100 transmits, to the HMD 10, a request to curb the frequency of executing the process of acquiring the positon of the terminal or the accuracy of the acquisition. Accordingly, the display control device 100 is able to curb the power consumption of the HMD 10, i.e., the terminal.

The server 200 includes a database that manages AR content for checking equipment in a factory as object data. The server 200 transmits the object data via the network N to the display control device 100 in response to a request from the display control device 100.

Figure 2:
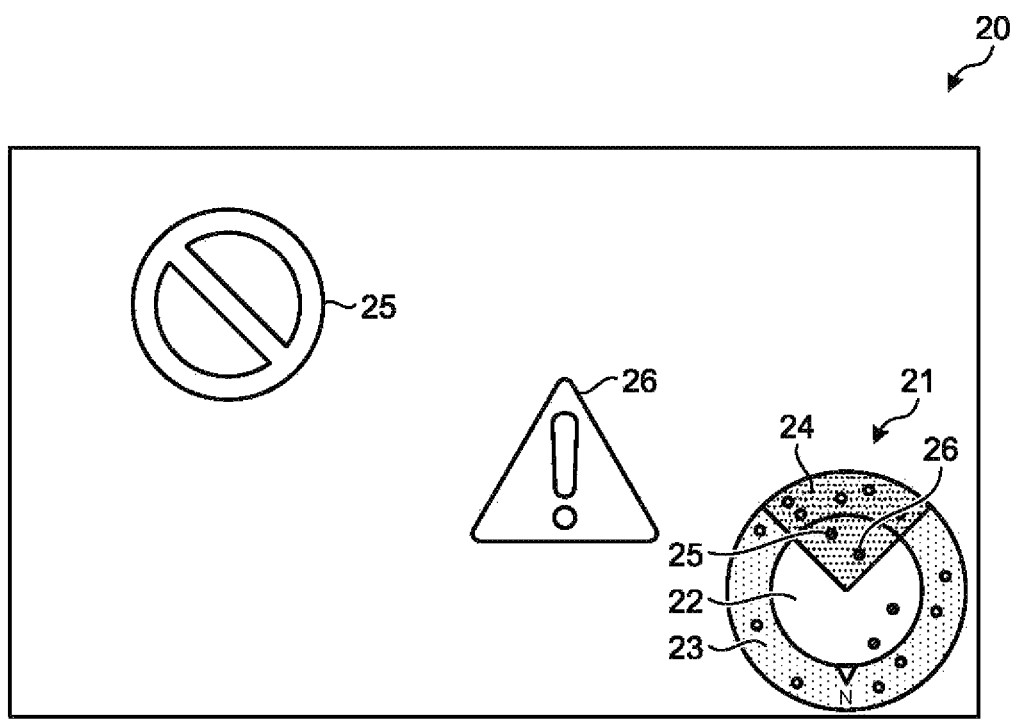
FIG. 2 is a diagram illustrating an exemplary display of object data.

An exemplary display screen displayed on the HMD 10 will be described. FIG. 2 is a diagram illustrating an exemplary display of object data. As illustrated in FIG. 2, a radar chart 21 and sets of AR content 25 and 26 that are sets of object data are displayed on a display screen 20. The case where AR content is used as exemplary object data will be described below. On the radar chart 21, positions of sets of object data are displayed around the user. The radar chart 21 includes a display area 22 in which object data is displayed in the display screen 20 and a pre-display area 23 that is set around the display area 22. In the radar chart 21, the sets of object data are represented by dots.

The object data in the pre-display area 23 is not displayed in the display screen 20 even when the user turns to the object data; however, when the user gets more close to the object data, the object data is displayed in the display screen 20. The radar chart 21 includes a field-of-view 24 indicating the field of view of the user. In other words, object data in the display area 22 and in the field-of-view 24 in the radar chart 21 is displayed on the display screen 20. As the dots corresponding to the sets of AR content 25 and 26 are in the field-of-view 24 on the display screen 20 illustrated in FIG. 2, the sets of AR content 25 and 26 are displayed on the display screen 20.

Figure 3:
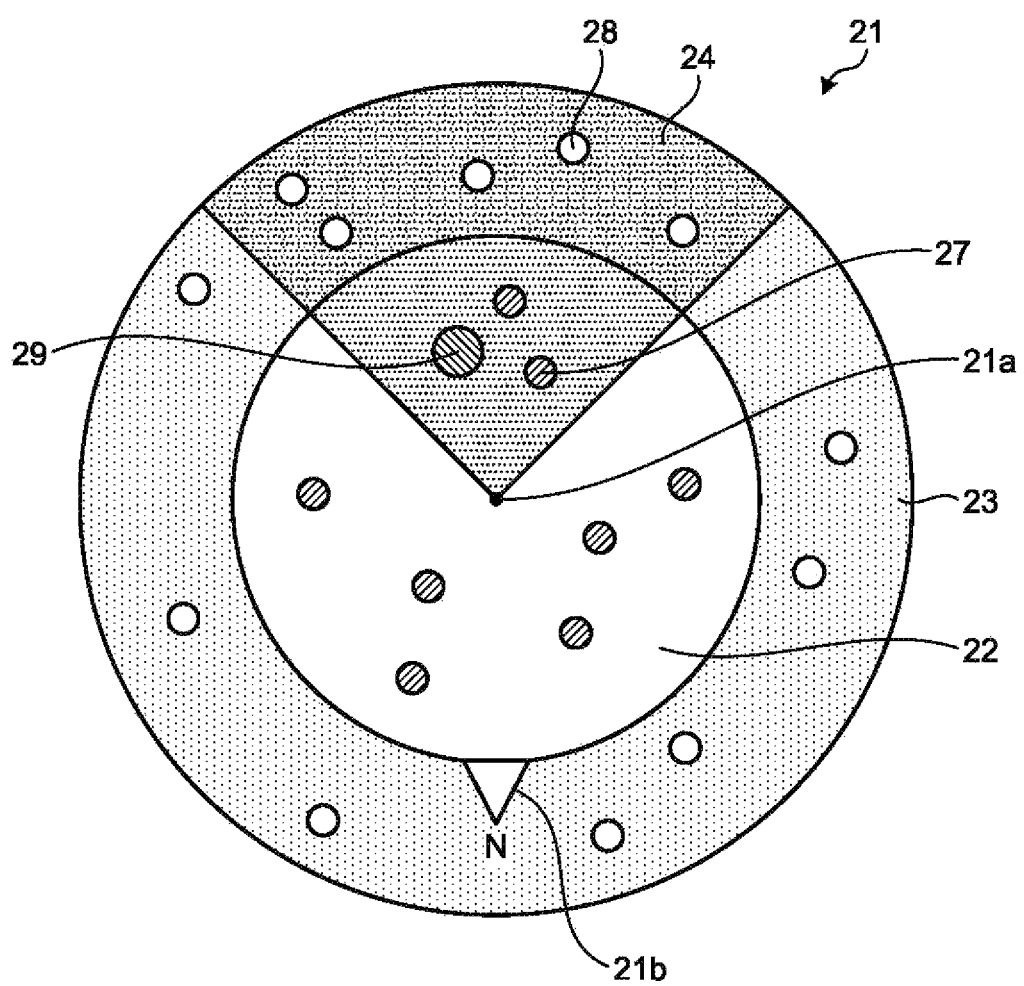
FIG. 3 is a diagram illustrating an exemplary radar chart.

FIG. 3 is a diagram illustrating an exemplary radar chart. FIG. 3 illustrates the enlarged radar chart 21. The radar chart 21 consists of a circle about a user position 21a. The radar chart 21 includes the display area 22 that is a circle whose radius is a given distance from the user position 21a and the pre-display area 23 that is an area surrounded by the circle of the display area 22 and a circle larger than the display area 22. An orientation sign 21b indicating the north is displayed on the radar chart 21. The orientation sign 21b may be movable according to the move and orientation of the user.

In the display area 22 and the pre-display area 23, for example, multiple dots indicating sets of object data are displayed and, for example, sets of object data 27 in the display area 22 and in the field-of-view 24 are displayed on the display screen. On the other hand, sets of object data 28 in the pre-display area 23 and in the field-of-view 24 are not displayed on the display screen. Object data 29 indicated by a dot larger than other dots indicates that the object data is being edited by the display control device 100. Editing object data includes, for example, changing the position and size of the object data and adding information.

Figure 4:
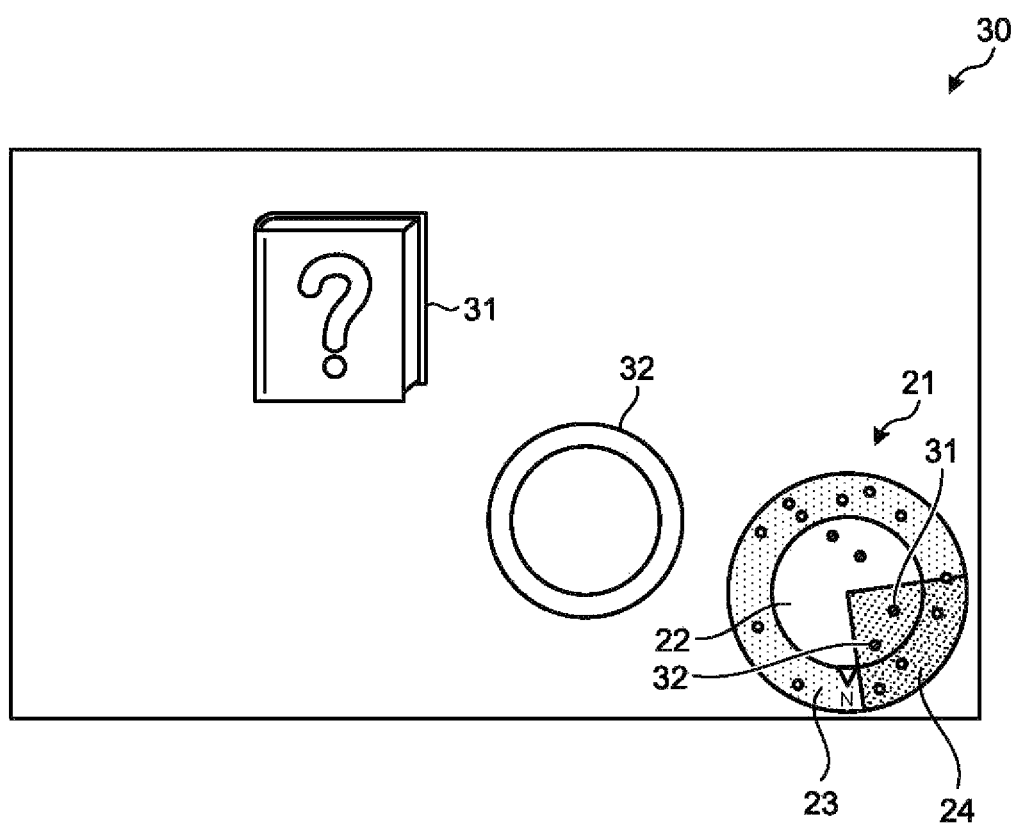
FIG. 4 is a diagram illustrating another exemplary display of object data.

FIG. 4 is a diagram illustrating another exemplary display of object data. As illustrated in FIG. 4, the orientation of the user on a display screen 30 is different from that on the display screen 20 illustrated in FIG. 2. In other words, the display screen 30 is a display screen in the case where the user has turned from the south to the northwest. On the radar chart 21 on the display screen 30, there are dots corresponding to sets of AR content 31 and 32 in the display area 22 and the field-of-view 24. For this reason, the sets of AR content 31 and 32 are displayed on the display screen 30. Note that the object data in the pre-display area 23 is not displayed.

Figure 5:
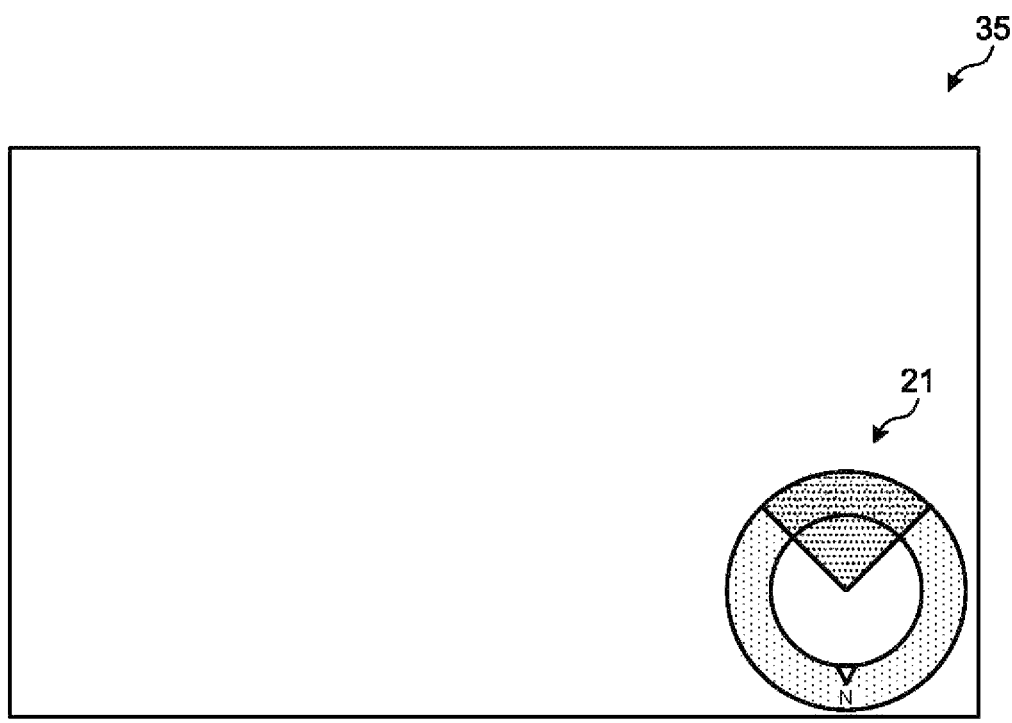
FIG. 5 is a diagram illustrating an exemplary display in the case where there is no object data in a display area.
Figure 6:
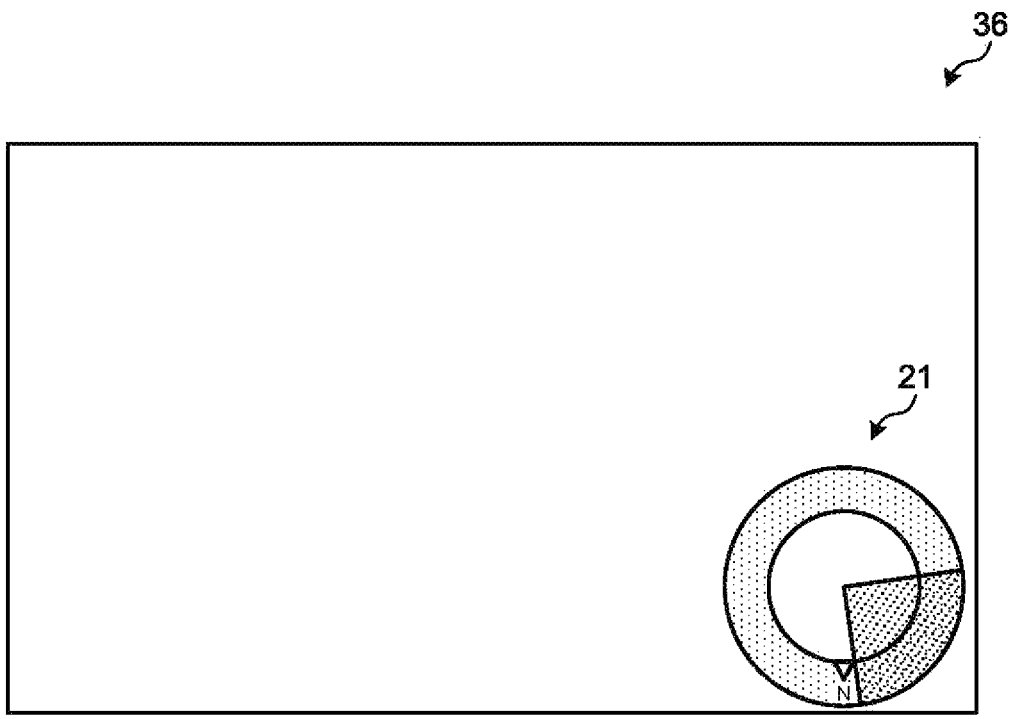
FIG. 6 is a diagram illustrating another exemplary display in the case where there is no object data in the display area.

FIG. 5 is a diagram illustrating exemplary display in the case where there is no object data in the display area. As illustrated in FIG. 5, a display screen 35 is a display screen in the case where there is no object data around the user, i.e., in the display area 22 and the pre-display area 23. As there is no object data around the user on the display screen 35, no dot indicating object data is displayed on the radar chart 21. FIG. 6 is a diagram illustrating another exemplary display in the case where there is no object data in the display area. As illustrated in FIG. 6, a display screen 36 is obtained when the orientation of the user illustrated in FIG. 35 changes. Even when the orientation changes, as there is still no object data around the user, no object data is displayed on the display screen 36 including the display in the radar chart 21. When there is no object data around the user as described above, detecting the orientation of the user is nonsense, which means that the orientation detection sensor may be stopped. In such a mode, as there is no object data near the user, reducing the frequency and accuracy of positioning by the position detection sensor that detects the position of the user, such as the GPS receiver, has no problem. The embodiment focuses attention on this aspect and reduces the power consumption of the HMD 10.

In order to reduce the power consumption of the HMD 10, the display control device 100 transmits a refraining request to refrain from acquiring the position to the HMD 10. FIG. 7 is a diagram illustrating exemplary operations relating to acquisition of the position in the case where there is no object data in the display area. As illustrated in FIG. 7, when there is no object data in the radar chart 21, the display control device 100 need not detect the position of the HMD 10, that is, the user with high accuracy, and therefore the display control device 100 transmits a refraining request to refrain from acquiring of the position to the HMD 10. The HMD 10 transmits sensor information indicating the position and orientation according to the received curbing request to the display control device 100.

FIG. 8 is a diagram illustrating exemplary operations relating to acquisition of the position in the case where there is object data in the display area. FIG. 8 illustrates the case where the user in FIG. 7 has moved to a position where object data is set. In other words, the display area 22 and the pre-display area 23 are determined and move according to the position of the user. As illustrated in FIG. 8, when there is object data in the radar chart 21, the display control device 100 is requested to detect the position of the HMD 10, that is, the user with high accuracy, and therefore the display control device 100 transmits a curbing cancel request to cancel curbing acquisition of the position to the HMD 10. The HMD 10 transmits sensor information indicating the position and orientation according to the received curbing cancel request to the display control device 100. As described above, the display control device 100 transmits a curbing request or a curbing cancel request to the HMD 10 according to whether there is object data in the radar chart 21, thereby reducing power consumption of the HMD 10.

A configuration of the HMD 10 will be described. As illustrated in FIG. 1, the HMD 10 includes a communication unit 11, a position detection sensor 12, an orientation detection sensor 13, a display unit 14, a storage unit 15, and a controller 16. The HMD 10 may include functional units, such as various input devices and sound output devices, in addition to the functional units illustrated in FIG. 1.

The communication unit 11 is realized by using, for example, a communication module, such as a wireless LAN. The communication unit 11 is a communication interface that is connected with the display control device 100 by, for example, Wi-Fi Direct (Trademark) and that manages communication of information with the display control device 100. The communication unit 11 receives sensor control information and a display screen from the display control device 100. The communication unit 11 outputs the received sensor control information and display screen to the controller 16. The communication unit 11 transmits sensor information that is input from the controller 16 to the display control device 100.

The position detection sensor 12 is a sensor that detects the position of the HMD 10, i.e., the position of the user. The position detection sensor 12 is, for example, a receiver for a global navigation satellite system, such as a global positioning system (GPS) receiver. The position detection sensor 12 generates position information containing the longitude, latitude and altitude on the basis of received GPS signals. The position detection sensor 12 outputs the generated position information to the controller 16. Control information to start or end the operation or change at least one of positioning frequency and positioning accuracy is input from the controller 16 to the position detection sensor 12. On the basis of the input control information, the position detection sensor 12 executes starting or ending the operation or changing the positioning frequency or the positioning accuracy. The position detection sensor 12 may be a sensor corresponding to another positioning system. When the display control device 100 performs positioning on the user, the position detection sensor 12 may stop operating, or the position detection sensor 12 need not necessarily be provided.

The position detection sensor 12, for example, is able to change the positioning accuracy to the three stages "high", "intermediate" and "low". For example, when the positioning accuracy is "high", for example, the sensitivity of the receiver is increased to widen the area in which it is possible to capture GPS satellites and thereby the positioning accuracy increases. At that time, the current consumption of the position detection sensor 12 is, for example, 100 mA/h. When the positioning accuracy is "intermediate", for example, the position detection sensor 12 reduces the sensitivity of the receiver to one lower than that in the case where the positioning accuracy is "high" to reduce the area in which it is possible to capture GPS satellites to an intermediate area and thereby, while the positioning accuracy becomes lower than the "high" positioning accuracy, it is possible to reduce the current consumption of the position detection sensor 12. At that time, it is possible to reduce the current consumption of the position detection sensor 12 to, for example, 25 mA/h. When the positioning accuracy is "low", for example, the position detection sensor 12 further lowers the sensitivity of the receiver to one in the case where the positioning accuracy is "intermediate" to reduce the area in which it is possible to capture GPS satellites. Accordingly, when the positioning accuracy is "low", while the positioning accuracy is lower than the "intermediate" positioning accuracy, it is possible to further reduce the current consumption of the position detection sensor 12 compared to the case where the positioning accuracy is "intermediate". At that time, it is possible to reduce the current consumption of the position detection sensor 12 to, for example, 20 mA/h.

The orientation detection sensor 13 is a sensor that detects the orientation of the HMD 10, i.e., the user. The orientation detection sensor 13, for example, detects the orientation of the user, that is, the direction in which the user faces by using, for example, an accelerometer, a gyro sensor and an orientation sensor. For the accelerometer, a piezo-resistive or capacitive 3-axis accelerometer may be used. For the gyro sensor, for example, a vibrating gyro sensor may be used. For the orientation sensor, for example, a magnetic sensor may be used. The orientation detection sensor 13 outputs orientation information containing the detected orientation to the controller 16. Control information for, for example, starting or ending the operation and changing the cycle of positioning is input from the controller 16 to the orientation detection sensor 13. The orientation detection sensor 13 executes, for example, starting or ending the operation and changing the cycle of positioning according to the input control information.

The display unit 14 is a display device for displaying various types of information. The display unit 14, for example, corresponds to a see-through HMD display device having a half mirror on which a video is projected and enabling a user to view the video image and the external scenery through the half mirror. The display unit 14 may be a display device corresponding to an immersive, video see-through or retinal projection HMD.

The storage unit 15 is implemented by a storage device, such as a semiconductor memory device, such as a random access memory (RAM) or a flash memory. The storage unit 15 stores information used for processing performed by the controller 16.

For example, a central processing unit (CPU) or a micro processing unit (MPU) uses a RAM as a work area and executes a program stored in an internal storage device, thereby implementing the controller 16. The controller 16 may be implemented by, for example, an integrated circuit, such as an application specific integrated circuit (ASIC) or a field programmable gate array (FPGA). The controller 16 includes a sensor controller 17 and a display controller 18 and implements or executes functions and actions of the information processing described below. The internal configuration of the controller 16 is not limited to the configuration illustrated in FIG. 1. The controller 16 may have a different configuration as long as the configuration enables the information processing described below.

The sensor controller 17 controls the position detection sensor 12 and the orientation detection sensor 13 according to the sensor control information received from the display control device 100 via the communication unit 11. For example, when the HMD 10 is powered, the sensor controller 17 starts controlling the position detection sensor 12 and the orientation detection sensor 13. The sensor controller 17, for example, receives, from the display control device 100, sensor control information containing an instruction to start acquiring position information and orientation information from the display control device 100 via the communication unit 11. On receiving the sensor control information, the sensor controller 17 outputs control information enabling the position detection sensor 12 and the orientation detection sensor 13 to output position information and orientation information to the position detection sensor 12 and the orientation detection sensor 13.

The sensor controller 17, for example, receives sensor control information containing a curbing request or a curbing cancel request from the display control device 100 via the communication unit 11. On receiving the sensor control information, the sensor controller 17 outputs control information that changes at least one of the positioning frequency and the positioning accuracy to the position detection sensor 12. On receiving the sensor control information, the sensor controller 17 outputs control information that changes the positioning cycle to the orientation detection sensor 13.

The sensor controller 17 is able to set the positioning accuracy "high", "intermediate" or "low" with respect to the position detection sensor 12 according to sensor control information containing a curbing request or a curbing cancel request. For example, when positioning is started, the sensor controller 17 sets the positioning accuracy "high" with respect to the position detection sensor 12. On receiving sensor control information containing a curbing request to set the positioning accuracy "intermediate", the sensor controller 17 sets the positioning accuracy "intermediate". On receiving sensor control information containing a curbing request to set the positioning accuracy "low", the sensor controller 17 sets the positioning accuracy "low".

On the other hand, on receiving sensor control information containing a curbing cancel request to set the positioning accuracy "intermediate", the sensor controller 17 sets the positioning accuracy "intermediate". On receiving sensor control information containing a curbing cancel request to set the positioning accuracy "high", the sensor controller 17 sets the positioning accuracy "high".

The sensor controller 17 may, on receiving sensor control information containing a curbing request, change the positioning accuracy from the current positioning accuracy to positioning accuracy at the next stage on the curbed side. The sensor controller 17 may, on receiving curbing cancel request, change the positioning accuracy from the current positioning accuracy to the next stage on the curbing-canceled side. The sensor controller 17 may, on receiving a curbing request when the positioning accuracy is "high", set the positioning accuracy "low". The sensor controller 17 may, on receiving a curbing cancel request when the positioning accuracy is "low", for example, set the positioning accuracy "high". The positioning frequency, that is, the positioning interval, may be, for example, 10 seconds at any positioning accuracy.

The sensor controller 17 may set the positioning frequency, that is, the frequency of executing the process of acquiring the position "high", "intermediate" or "low" with respect to the position detection sensor 12. When the positioning frequency is "high", for example, the sensor controller 17 sets 10 seconds for the positioning interval. When the frequency of positioning is "intermediate", for example, the sensor controller 17 sets 20 seconds for the positioning interval. When the frequency of positioning is "low", for example, the sensor controller 17 sets 30 seconds for the positioning interval. In this manner, the sensor controller 17 may reduce the power consumption by changing the positioning frequency. Exemplary settings made with respect to the positioning frequency are similar to those of the positioning accuracy and therefore descriptions thereof will be provided below.

When inputting position information from the position detection sensor 12 is started, the sensor controller 17 generates sensor information containing the position information started to be input and starts transmitting the generated sensor information to the display control device 100 via the communication unit 11. When inputting orientation information from the orientation detection sensor 13 is started, the sensor controller 17 generates sensor information containing the orientation information started to be input and starts transmitting the generated sensor information to the display control device 100 via the communication unit 11. The sensor controller 17 transmits at least one of position information and orientation information, for example, once every other second. The sensor controller 17 may change the interval and transmits the sensor information to, for example, once every other 10 seconds or 30 seconds when the sensor controller 17 sets the positioning accuracy "intermediate" or "low" with respect to the position detection sensor 12.

The display controller 18 causes the display unit 14 to display a display screen that is received from the display control device 100 via the communication unit 11. The display controller 18 updates the display on the display unit 14 according to the update of the display screen.

A configuration of the display control device 100 will be described. As illustrated in FIG. 1, the display control device 100 includes a first communication unit 110, a second communication unit 111, a display operation unit 112, a storage unit 120, and a controller 130. The display control device 100 may include various types of functional units that a known computer includes, such as various input devices and sound output devices, in addition to the functional units illustrated in FIG. 1.

The first communication unit 110 is implemented by, for example, a communication module, such as a wireless LAN. The first communication unit 110 is, for example, a communication interface that is wirelessly connected to the HMD 10 by, for example, Wi-Fi Direct (trademark) and that manages communication of information with the HMD 10. The first communication unit 110 receives sensor information from the HMD 10. The first communication unit 110 outputs the received sensor information to the controller 130. The first communication unit 110 transmits, to the HMD 10, sensor control information and a display screen that are input from the controller 130.

The second communication unit 111 is, for example, implemented by a third-generation mobile communication system, a mobile phone line according to, for example, long term evolution (LTE), a communication module, such as a wireless LAN, etc. The second communication unit 111 is a communication interface that is wirelessly connected to the server 200 via the network N and that manages communication of information with the server 200. The second communication unit 111 transmits a data acquisition instruction that is input from the controller 130 to the server 200 via the network N. The second communication unit 111 receives object data according to a data acquisition instruction from the server 200 via the network N. The second communication unit 111 outputs the received object data to the controller 130.

The display operation unit 112 serves as a display device for displaying various types of information and as an input device that accepts various operations from the user. For example, the display operation unit 112 serving as the display device is implemented by, for example, a liquid crystal display. The display operation unit 112 serving as the input device is implemented by, for example, a touch panel. In other words, the display device and the input device are integrated into the display operation unit 112. The display operation unit 112 outputs an operation that is input by the user as operation information to the controller 130. The display operation unit 112 may display the same screen as that of the HMD 10 or may display a screen different from that of the HMD 10.

The storage unit 120 is implemented by, for example, a semiconductor memory device, such as a RAM or a flash memory, or a storage device, such as a hard disk or an optical disk. The storage unit 120 includes an object data storage unit 121. The storage unit 120 stores information used for processing performed by the controller 130.

The object data storage unit 121 stores object data that is acquired from the server 200. FIG. 9 is a diagram illustrating an exemplary object data storage unit. As illustrated in FIG. 9, the object data storage unit 121 has the items "object identifier (ID)", "object data" and "position information". The object data storage unit 121 stores each set of object data as one record.

An "object ID" is an identifier that identifies object data, that is, AR content. "Object data" is information indicating object data that is acquired from the server 200. "Object data" is, for example, a data file forming object data, that is, AR content. "Position information" is position information that is associated with object data. "Position information" is information indicating position information in the world coordinate system of the associated object data.

For example, a central processing unit (CPU) or a micro processing unit (MPU) uses a RAM as a work area and executes a program stored in an internal storage device, thereby implementing the controller 130. The controller 130 may be implemented by, for example, an integrated circuit, such as an ASIC or a FPGA. The controller 130 includes a display controller 131, an acquisition unit 132, a calculator 133, a determination unit 134, and a curbing unit 135 and implement or execute functions and actions of the information processing described below. The internal configuration of the controller 130 is not limited to the configuration illustrated in FIG. 1. The controller 130 may have a different configuration as long as the configuration enables the information processing described below.

The display controller 131 starts an application using AR middleware. On starting the application, the display controller 131 start transmitting a display screen of the application to the HMD 10 via the first communication unit 110.

On starting the application, the display controller 131 transmits a data acquisition instruction to the server 200 via the second communication unit 111 and the network N. On receiving object data corresponding to the data acquisition instruction from the server 200 via the second communication unit 111 and the network N, the display controller 131 stores the received object data in the object data storage unit 121.

On starting the application, the display controller 131 transmits sensor control information containing an instruction to start acquiring position information and orientation information to the HMD 10 via the first communication unit 110.

When the display area 22 and the pre-display area 23 are input from the calculator 133 to the display controller 131, the display controller 131 displays the radar chart 21 on the display screen. When the positions of sets of object data in the display area 22 and the pre-display area 23 are input from the determination unit 134 to the display controller 131, the display controller 131 displays the input positions of sets of object data on the display area 22 and the pre-display area 23.

When the field-of-view 24 is input from the calculator 133 to the display controller 131, the display controller 131 displays the input field-of-view 24 on the display area 22 and the pre-display area 23 in a superimposed manner. The display controller 131 refers to the object data storage unit 121 and displays the object data in the display area 22 and in the field-of-view 24 on the display screen. In other words, when there is object data registered in a position in the display area 22, the display controller 131 displays the object data on the display screen. In other words, when there is object data that is registered in a position in the display area 22, the display screen containing the object data is transmitted to the HMD 10 and the display unit 14 of the HMD 10 is caused to display the display screen.

The acquisition unit 132 starts receiving sensor information from the HMD 10 via the first communication unit 110. In other words, the acquisition unit 132 starts acquiring the position information contained in the sensor information. The acquisition unit 132 outputs the acquired position information to the calculator 133. In other words, the acquisition unit 132 cooperates with the sensor controller 17 of the HMD 10 to execute the process of acquiring the position of the terminal. In other words, the acquisition unit 132 cooperates with the sensor controller 17 of the HMD 10 to perform positioning using signals of the global navigation satellite system, thereby acquiring the position of the terminal.

When position information is input from the acquisition unit 132 to the calculator 133, the calculator 133 sets the display area 22 and the pre-display area 23 on the basis of the user position information and the pre-set distances corresponding to the display area 22 and the pre-display area 23. The calculator 133 calculates the distance between the user and object data on the basis of the input position information. In other words, the calculator 133 calculates distances each from the user to each of multiple sets of object data. The calculator 133 outputs the display area 22 and the pre-display area 23, which are set, to the display controller 131 and the determination unit 134. The calculator 133 outputs the calculated distances between the user and the sets of object data to the determination unit 134.

The calculator 133 may accept specifying distances corresponding to the display area 22 and the pre-display area 23 by the user. In other words, the calculator 133 accepts specifying distances from the position of the user, that is, the position of the terminal. The calculator 133 determines an area on the basis of the acquired position information, that is, the position of the terminal, and the specified distances. In other words, the calculator 133 is an exemplary accepting unit and an exemplary determination unit. Note that the area is the display area 22 but the area may cover the pre-display area 23.

The orientation information contained in the sensor information that is received via the first communication unit 110 is input to the calculator 133. The calculator 133 sets the field-of-view 24 of the user on the basis of the pre-display area 23 and the orientation information. The calculator 133 outputs the set field-of-view 24 to the display controller 131.

The distances between the user and sets of object data and the display area 22 and the pre-display area 23, which are set, are input from the calculator 133 to the determination unit 134. The determination unit 134 refers to the object data storage unit 121 and determines whether there is object data registered in a position in the display area 22. In other words, the determination unit 134 determines whether the distance between the user and the object data is in the display area 22. When the distance between the user and the object data is in the display area 22, the determination unit 134 outputs a setting instruction to set the positioning accuracy "high" to the curbing unit 135.

When the distance between the user and the object data is not in the display area 22, the determination unit 134 determines whether the distance between the user and the object data is in the pre-display area 23. When the distance between the user and the object data is in the pre-display area 23, the determination unit 134 outputs an instruction to set the positioning accuracy "intermediate" to the curbing unit 135. When the distance between the user and the object data is not in the pre-display area 23, the determination unit 134 outputs an instruction to set the positioning accuracy "low" to the curbing unit 135. The determination unit 134 may output, instead of the positioning accuracy setting instruction, a setting instruction to set the frequency of executing the process of acquiring the positioning frequency, that is, the frequency of acquiring the position "high", "intermediate" or "low" to the curbing unit 135. The determination unit 134 may output a setting instruction to make settings with respect to both the positioning accuracy and the positioning frequency.

When outputting a setting instruction to set the positioning accuracy "high" or "intermediate" to the curbing unit 135, the determination unit 134 keeps outputting the positions of the sets of object data in the display area 22 and the pre-display area 23 to the display controller 131. In this case, when there is no position of object data in the display area 22 and the pre-display area 23, the determination unit 134 stops outputting positions of object data.

When a setting instruction is input from the determination unit 134 into the curbing unit 135, the curbing unit 135 generates sensor control information containing a curbing request or a curbing cancel request according to the input setting instruction. For example, when a setting instruction to set the positioning accuracy "high" is input from the determination unit 134 to the curbing unit 135, the curbing unit 135 generates sensor control information containing a curbing cancel request to set the positioning accuracy "high". When a setting instruction to set the positioning accuracy "intermediate" is input from the determination unit 134 to the curbing unit 135 and if the previous positioning accuracy is "high", the curbing unit 135 generates sensor control information containing a curbing request to set the positioning accuracy "intermediate". On the other hand, if the previous positioning accuracy is "low", the curbing unit 135 generates sensor control information containing a curbing cancel request to set the positioning accuracy "intermediate".

For example, when a setting instruction to set the positioning accuracy "low" is input from the determination unit 134 to the curbing unit 135, the curbing unit 135 generates sensor control information containing a curbing request to set the positioning accuracy "low". When a positioning frequency setting instruction is input instead of a positioning accuracy setting instruction or together with a positioning accuracy setting instruction from the determination unit 134 to the curbing unit 135, the curbing unit 135 generates sensor control information containing a positioning frequency curbing request or a curbing cancel request. The curbing unit 135 transmits the generated sensor control information to the HMD 10 via the first communication unit 110.

In other words, when there is no object data registered in a position in the area, the curbing unit 135 curbs the frequency of executing the process of acquiring the position of the terminal or the acquisition accuracy. When there is object data that is registered in a position in the area, the curbing unit 135 does not curb the execution frequency or the acquisition accuracy.

In other words, when there is no object data registered in a position of the area, the curbing unit 135 curbs the frequency of executing computing based on the signals of the global navigation satellite system. When there is no object data registered in a position in the area, the curbing unit 135 curbs the positioning accuracy based on the signals of the global navigation satellite system.

Figure 10:
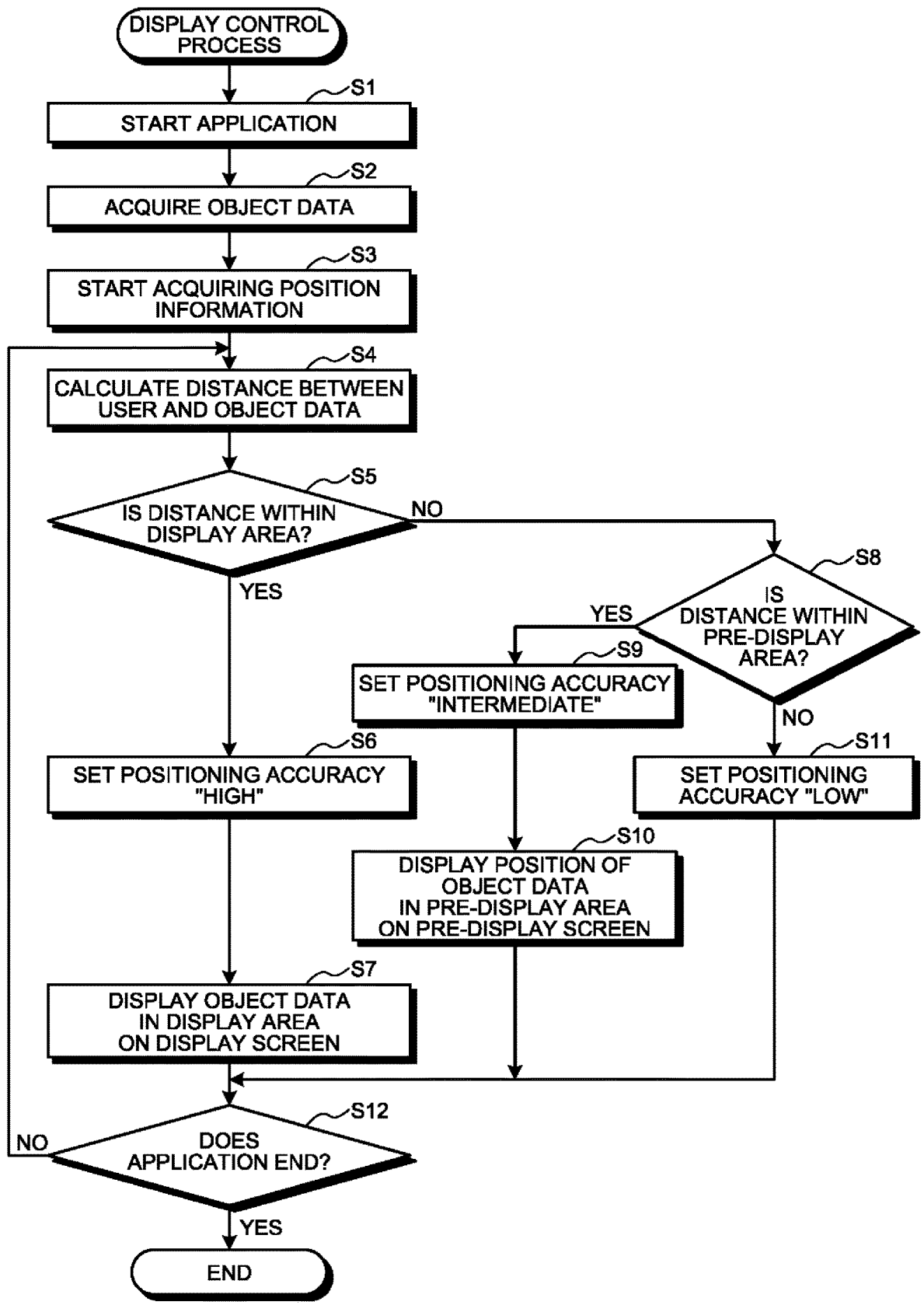
FIG. 10 is a flowchart illustrating an exemplary display control process according to the embodiment.

Operations of the display control system 1 according to the embodiment will be described. FIG. 10 is a flowchart illustrating an exemplary display control process according to the embodiment.

The display controller 131 of the display control device 100 starts the application using AR middleware (step S1). On starting the application, the display controller 131 starts transmitting a display screen of the application to the HMD 10.

On starting the application, the display controller 131 transmits a data acquisition instruction to the server 200. On receiving object data corresponding to the data acquisition instruction from the server 200, the display controller 131 stores the received object data in the object data storage unit 121 (step S2).

On starting the application, the display controller 131 transmits sensor control information containing an instruction to start acquiring position information and orientation information to the HMD 10. On receiving the sensor control information, the sensor controller 17 of the HMD 10 outputs control information that causes the position detection sensor 12 and the orientation detection sensor 13 to start outputting position information and orientation information to the position detection sensor 12 and the orientation detection sensor 13. When inputting the positon information from the position detection sensor 12 is started, the sensor controller 17 generates sensor information containing the position information started to be input and starts transmitting the generated sensor information to the display control device 100. The sensor controller 17 may include the orientation information, which is input from the orientation detection sensor 13, in the sensor information. The acquisition unit 132 of the display control device 100 starts receiving the sensor information from the HMD 10. In other words, the acquisition unit 132 starts acquiring the position information contained in the sensor information (step S3). The acquisition unit 132 outputs the acquired position information to the calculator 133.

When the position information is input from the acquisition unit 132 to the calculator 133, the calculator 133 sets the display area 22 and the pre-display area 23 on the basis of the user position information and the pre-set distances corresponding to the display area 22 and the pre-display area 23. The calculator 133 calculates a distance between the user and the object data on the basis of the input position information (step S4). The calculator 133 outputs the display area 22 and the pre-display area 23, which are set, to the display controller 131 and the determination unit 134. The calculator 133 also outputs the calculated distance between the user and the object data to the determination unit 134.

When the display area 22 and the pre-display area 23 are input from the calculator 133 to the display controller 131, the display controller 131 implements display of the radar chart 21 on the display screen. The calculator 133 sets the filed-of-view 24 of the user according to the display area 22, the pre-display area 23 and the orientation information. The calculator 133 outputs the set filed-of-view 24 to the display controller 131. When the field-of-view 24 is input from the calculator 133 to the display controller 131, the display controller 131 displays the input field-of-view 24 on the display area 22 and the pre-display area 23 in a superimposed manner.

The distance between the user and the object data and the display area 22 and the pre-display area 2, which are set, are input from the calculator 133 to the determination unit 134. With reference to the object data storage unit 121, the determination unit 134 determines whether the distance between the user and the object data is in the display area 22 (step S5). When the distance between the user and the object data is in the display area 22 (YES at step S5), the determination unit 134 outputs a setting instruction to set the positioning accuracy "high" to the curbing unit 135. When the setting instruction is input from the determination unit 134 to the curbing unit 135, the curbing unit 135 generates sensor control information containing a curbing cancel request to set the positioning accuracy "high" (step S6). The curbing unit 135 transmits the generated sensor control information to the HMD 10. The determination unit 134 also outputs the positions of sets of object data in the display area 22 and the pre-display area 23 to the display controller 131.

When the positons of sets of object data in the display area 22 and the pre-display area 23 are input from the determination unit 134 to the display controller 131, the display controller 131 displays the input positons of the object data on the display area 22 and the pre-display area 23. The display controller refers to the object data storage unit and displays the object data in the display area 22 and in the field-of-view 24 on the display screen (step S7) and goes to step S12.

Step S5 will be referred back and described. When the distance between the user and the object data is not in the display area 22 (NO at step S5), the determination unit 134 determines whether the distance between the user and the object data is in the pre-display area 23 (step S8). When the distance between the user and the object data is in the pre-display area 23 (YES at step S8), the determination unit 134 outputs a setting instruction to set the positioning accuracy "intermediate" to the curbing unit 135. Once the setting instruction is input from the determination unit 134 to the curbing unit 135, the curbing unit 135 generates sensor control information containing a curbing request or a curbing cancel request to set the positioning accuracy "intermediate" (step S9). The curbing unit 135 transmits the generated sensor control information to the HMD 10. The determination unit 134 outputs the position of the object data in the pre-display area 23 to the display controller 131.

When the positon of the object data in the pre-display area 23 is input from the determination unit 134 to the display controller 131, the display controller 131 displays the position of the input object data on the pre-display area 23 (step S10) and goes to step S12.

When the distance between the user and the object data is not in the pre-display area 23 (NO at step S8), the determination unit 134 outputs a setting instruction to set the positioning accuracy "low" to the curbing unit 135. When the setting instruction is input from the determination unit 134 to the curbing unit 135, the curbing unit 135 generates sensor control information containing a curbing request to set the positioning accuracy "low" (step S11). The curbing unit 135 transmits the generated sensor control information to the END 10 and goes to step S12.

The display controller 131 of the display control device 100 determines whether the application has ended (step S12). When the application has not ended (NO at step S12), the display controller 131 returns to step S4. When the application ends (YES at step S12), the display controller 131 ends the display control process. In this manner, the display control device 100 is able to curb the power consumption of the HMD 10, that is, the terminal. In other words, the display control device 100 increases or decreases the current consumption of the position detection sensor 12 of the HMD 10 according to the positional relationship between the user and object data and the setting of the display area 22 and the pre-display area 23, thereby curbing the power consumption relating to positioning.

In the embodiment, the HMD 10 performs positioning on the user; however, the embodiments are not limited thereto. For example, the display control device 100 may perform positioning on the user.

The above-described embodiment illustrates the mode where the user wears the display control device 100 and the HMD 10; however, the embodiments are not limited thereto. For example, the position detection sensor 12 and the orientation detection sensor 13 may be provided to the display control device 100 and the display control device 100 that is, for example, a smartphone may independently perform the display control process to display a display screen on the display operation unit 112. The object data storage unit 121, the display controller 131, the acquisition unit 132, the calculator 133, the determination unit 134 and the curbing unit 135 may be provided to the HMD 10 to allow the HMD 10 to independently perform the display control process.

The above-described embodiment illustrates the case where the GPS receiver of the position detection sensor 12 is used as the process of acquiring the position of the user, that is, the terminal; however, the embodiments are not limited thereto. For example, the position of the user, that is, the terminal, may be acquired by performing positioning with a plurality of positioning units in addition to the position detection sensor 12. For example, at least two positioning units from a global navigation satellite system, a positioning unit using mobile phone base stations, and a positioning unit using wireless LAN access points can be taken as the positioning units. For example, the positioning unit using mobile phone base stations regards, as the position of the user, the information about the position of a mobile phone base station to which the display control device 100 owned by the user is connected. In this case, the display control device 100 identifies the mobile phone base station by using a mobile phone base station ID. For example, the positioning unit using wireless LAN access points regards, as the position of the user, information about the position of a wireless LAN access point to which the display control device 100 owned by the user is connected. In this case, the display control device 100 identifies the wireless LAN access point by using a media access control (MAC) address of the wireless LAN access point. When it is possible to receive electric waves of multiple wireless LAN access points, the positioning unit using wireless LAN access points may perform positioning by using the intensity of electric waves from the respective access points. When positioning is performed by using such a plurality of positioning units, the curbing unit 135 is able to curb the frequency of executing the process of acquiring the position of the terminal or the acquisition accuracy by reducing the number of positioning units to be used for positioning among the positioning units. When there is no object data registered in a position in the display area 22, that is, in the area, the curbing unit 135 performs the above-described curbing process.

As described above, the display control device 100 executes the process of acquiring the positon of the user, that is, the terminal. The display control device 100 includes the object data storage unit 121 that stores the positions in which multiple sets of object data are registered, respectively, in association with the sets of object data. Furthermore, the display control device 100 refers to the object data storage unit 121 and determines whether there is object data that is registered in a position in the area corresponding to an acquired position. When there is object data that is registered in a position in the area, the display control device 100 causes the display unit 14 of the HMD 10 to display the object data. Furthermore, when there is no object data that is registered in a position in the area, the display control device 100 curbs the frequency of executing the process of acquiring the position of the terminal or the acquisition accuracy. As a result, the display control device 100 is able to curb the power consumption of the HMD 10, that is, the terminal.

The display control device 100 accepts specifying a distance from the position of the terminal. On the basis of the acquired position of the terminal and the specified distance, the display control device 100 determines an area. As a result, when there is no object data in an area corresponding to the accepted distance, the display control device 100 is able to curb the power consumption of the HMD 10.

The display control device 100 acquires the position of the terminal by performing positioning by using signals of the global navigation satellite system. When there is no object data registered in a position in the area, the display control device 100 curbs the frequency of executing computing based on the signals. As a result, the display control device 100 is able to curb the power consumption of the HMD 10.

The display control device 100 acquires the position of the terminal by performing positioning by using signals of the global navigation satellite system. When there is no object data registered in a position in the area, the display control device 100 curbs the positioning accuracy based on the signals. As a result, the display control device 100 is able to curb the power consumption of the HMD 10.

The display control device 100 acquires the position of the terminal by performing positioning by using the positioning units. When there is no object data registered in a position in the area, the display control device 100 reduces the number of the positioning units to be used for positioning, thereby curbing the frequency of executing the process of acquiring the positon of the terminal or the acquisition accuracy. As a result, by using the positioning unit consuming less power, the display control device 100 is able to further curb the power consumption of the HMD 10.

The positioning units of the display control device 100 are two or more positioning units from a global navigation satellite system, a positioning unit that uses mobile phone base stations, and a positioning unit that uses wireless LAN access points. As a result, by using the positioning unit consuming less power, the display control device 100 is able to further curb the power consumption of the HMD 10.

The embodiment exemplifies checking equipment in a factory; however, the embodiments are not limited thereto. For example, the embodiment may be applied to, for example, a guide to places of interest in a tourist spot.

The components of each unit illustrated in the drawings need not necessarily be configured physically as illustrated in the drawings. In other words, specific modes of dispersion and integration among units are not limited to those illustrated in the drawings. All or part of the units may be distributed or integrated functionally or physically according to a given unit in accordance with various types of load and the usage. For example, the determination unit 134 and the curbing unit 135 may be integrated. The steps illustrated in the drawings are not limited to the above-described order. The steps may be performed simultaneously or may be performed in a different order as long as no inconsistency is caused in the content of the steps.

All or part of various processing functions implemented in the devices may be implemented on a CPU (or a microcomputer, such as a MPU or a micro controller unit (MCU)). Obviously, all or given part of the various processing functions may be implemented by a program that is analyzed and executed by a CPU (or a microcomputer, such as a MPU or a MCU) or by hardware using a wired logic.

Figure 11:
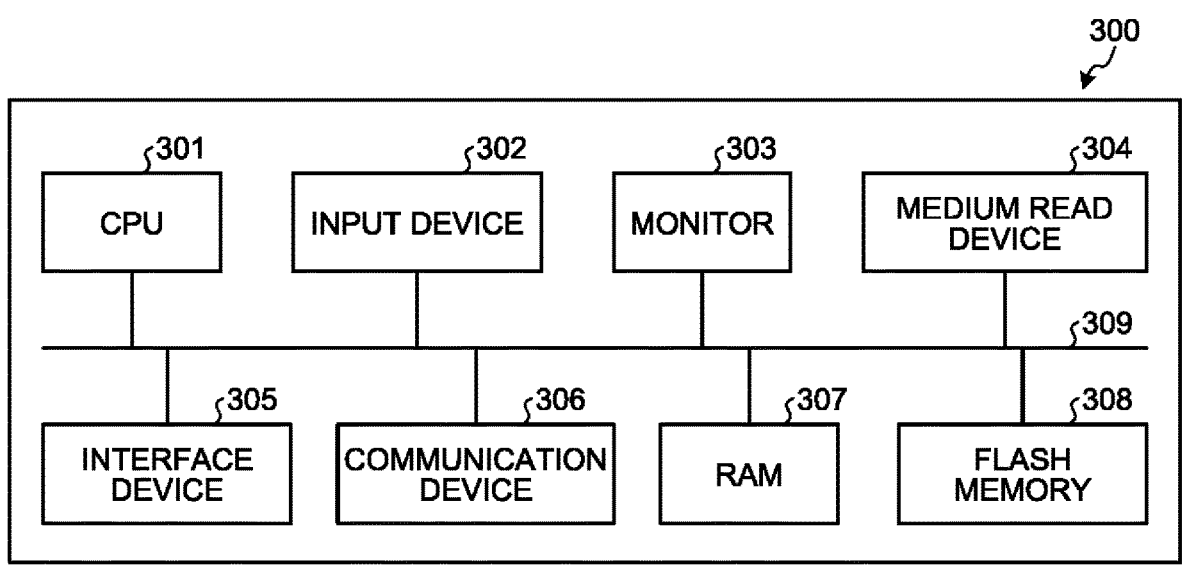
FIG. 11 is a diagram illustrating an exemplary computer that executes a display control program.

It is possible to implement the various processes described in the above-described embodiments by executing a program, prepared in advance, with a computer. An exemplary computer that executes a program having the same functions as those of the above-described embodiment will be described below. FIG. 11 is a diagram illustrating an exemplary computer that executes a display control program.

As illustrated in FIG. 11, a computer 300 includes a CPU 301 that executes various types of computing, an input device 302 that receives data inputs, and a monitor 303. The computer 300 includes a medium read device 304 that reads a program, etc., from a storage medium, an interface device 305 for connection with various devices, and a communication device 306 for connection with other information processing devices by wired or wireless connection. The computer 300 further includes a RAM 307 and a flash memory 308 that temporarily store various types of information. Each of the devices 301 to 308 is connected to a bus 309.

A display control program having the same functions as those of the processors of the display controller 131, the acquisition unit 132, the calculator 133, the determination unit 134 and the curbing unit 135 illustrated in FIG. 1 is stored in the flash memory 308. The object data storage unit 121 and various types of data for implementing the display control program are stored in the flash memory 308. The input device 302 receives inputs of various types of information, such as operation information, from the user of the computer 300. The monitor 303 displays, for example, various screens, such as a display screen, to the user of the computer 300. For example, a headphone is connected to the interface device 305. The communication device 306 has the same functions as those of the first communication unit 110 and the second communication unit 111 illustrated in FIG. 1 and is connected to the HMD 10 and the network N to communicate various types of information with the HMD 10 and the server 200.

The CPU 301 reads each program that is stored in the flash memory 308, loads the program into the RAM 307, and executes the program to perform various types of processing. The programs enable the computer 300 to function as the display controller 131, the acquisition unit 132, the calculator 133, the determination unit 134, and the curbing unit 135 illustrated in FIG. 1.

The above-described display control program need not necessarily be stored in the flash memory 308. For example, the computer 300 may read and execute the program that is stored in a storage medium that is readable by the computer 300. The storage medium readable by the computer 300 corresponds to, for example, a portable recording medium, such as a CD-ROM, a DVD disk, or a universal serial bus (USE) memory, a semiconductor memory, such as a flash memory, or a hard disk drive. The display control program may be stored in a device that is connected to, for example, a public line, the Internet or a LAN and the computer 300 may read the display control program from the device and execute the display control program.

According to the embodiment, it is possible to curb the power consumption of the terminal.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a program that causes a computer to execute a process comprising:
    executing a process of acquiring a position of a terminal;
    fixing an area on the basis of the acquired position of the terminal and determining whether there is object data registered in a position in the fixed area corresponding to the acquired position by referring to a storage that stores positions in which multiple sets of the object data are registered in association with the sets of object data, respectively; and
    displaying object data on a display when there is the object data registered in a position in the area, and requesting to curb any one of frequency of executing the process of acquiring the position of the terminal and accuracy of the acquiring when there is no object data registered in a position in the area.

2. The non-transitory computer readable recording medium according to claim 1, wherein the curbing includes requesting to cancel curbing any one of the frequency of the executing and the accuracy of the acquiring when there is object data registered in a position in the area.

3. The non-transitory computer readable recording medium according to claim 1, wherein the process further comprises:
    accepting specifying a distance from the position of the terminal; and
    fixing the area on the basis of the specified distance.

4. The non-transitory computer readable recording medium according to claim 1, wherein
    the acquiring the position of the terminal includes acquiring the positon of the terminal by performing positioning using signals of a global navigation satellite system, and
    the curbing includes curbing frequency of executing computing based on the signals when there is no object data registered in a positon in the area.

5. The non-transitory computer readable recording medium according to claim 1, wherein
    the acquiring the position of the terminal includes acquiring the position of the terminal by performing positioning using signals of a global navigation satellite system, and
    the curbing includes curbing accuracy of positioning based on the signals when there is no object data registered in a positon in the area.

6. The non-transitory computer readable recording medium according to claim 1, wherein
    the acquiring the position of the terminal includes acquiring the position of the terminal by performing positioning using a plurality of positioning units; and
    the curbing includes, when there is no object data registered in a position in the area, curbing any one of frequency of executing the process of acquiring the position of the terminal and accuracy of the acquiring by reducing the number of the positioning units used for the positioning.

7. The non-transitory computer readable recording medium according to claim 6, wherein the positioning units are at least two of a global navigation satellite system, a positioning unit using mobile phone base stations, and a positioning unit using wireless LAN access points.

8. A display control method comprising:
    executing a process of acquiring a position of a terminal, using a processor;
    fixing an area on the basis of the acquired position of the terminal and determining whether there is object data registered in a position in the fixed area corresponding to the acquired position by referring to a storage that stores positions in which multiple sets of the object data are registered in association with the sets of object data, respectively, using the processor; and
    displaying object data on a display when there is the object data registered in a position in the area, and requesting to curb any one of frequency of executing the process of acquiring the position of the terminal and accuracy of the acquiring when there is no object data registered in a position in the area, using the processor.

9. The display control method according to claim 8, wherein the curbing includes not requesting to cancel curbing any one of the frequency of the executing and the accuracy of the acquiring when there is object data registered in a position in the area.

10. The display control method according to claim 8, further comprising:
    accepting specifying a distance from the position of the terminal, using the processor; and
    fixing the area on the basis of the specified distance, using the processor.

11. The display control method according to claim 8, wherein
- the acquiring the position of the terminal includes acquiring the positon of the terminal by performing positioning using signals of a global navigation satellite system, and
- the curbing includes curbing frequency of executing computing based on the signals when there is no object data registered in a positon in the area.

12. The display control method according to claim 8, wherein
- the acquiring the position of the terminal includes acquiring the position of the terminal by performing positioning using signals of a global navigation satellite system, and
- the curbing includes curbing accuracy of positioning based on the signals when there is no object data registered in a positon in the area.

13. The display control method according to claim 8, wherein
- the acquiring the position of the terminal includes acquiring the position of the terminal by performing positioning using a plurality of positioning units; and
- the curbing includes, when there is no object data registered in a position in the area, curbing any one of frequency of executing the process of acquiring the position of the terminal and accuracy of the acquiring by reducing the number of the positioning units used for the positioning.

14. A display control device comprising:
a memory; and
a processor coupled to the memory, wherein the processor executes a process comprising:
acquiring a position of a terminal;
fixing an area on the basis of the acquired position of the terminal and determining whether there is object data registered in a position in the fixed area corresponding to the acquired position by referring to a storage that stores positions in which multiple sets of the object data are registered in association with the sets of object data, respectively; and
displaying object data on a display when there is the object data registered in a position in the area, and requesting to curb any one of frequency of executing the process of acquiring the position of the terminal and accuracy of the acquiring when there is no object data registered in a position in the area.

15. The display control device according to claim 14, wherein the curbing includes requesting to cancel curbing any one of the frequency of the executing and the accuracy of the acquiring when there is object data registered in a position in the area.

16. The display control device according to claim 14, wherein the processor executes the process comprising:
accepting specifying a distance from the position of the terminal; and
fixing the area on the basis of the specified distance.

17. The display control device according to claim 14, wherein
- the acquiring includes, acquiring the position of the terminal by performing positioning using signals of a global navigation satellite system, and
- the curbing includes, curbing frequency of executing computing based on the signals when there is no object data registered in a positon in the area.

18. The display control device according to claim 14, wherein
- the acquiring includes, acquiring the position of the terminal by performing positioning using signals of a global navigation satellite system, and
- the curbing includes, curbing accuracy of positioning based on the signals when there is no object data registered in a positon in the area.

19. The display control device according to claim 14, wherein
- the acquiring includes, acquiring the position of the terminal by performing positioning using a plurality of positioning units; and
- the curbing includes, when there is no object data registered in a position in the area, curbing any one of frequency of executing the process of acquiring the position of the terminal and accuracy of the acquiring by reducing the number of the positioning units used for the positioning.

* * * * *